United States Patent [19]

Goodbar

[11] 4,040,725

[45] Aug. 9, 1977

[54] DISPLAY ILLUMINATING STRUCTURE

[75] Inventor: Isaac Goodbar, Queens Village, N.Y.

[73] Assignee: Edison Price, Inc., New York, N.Y.

[21] Appl. No.: 651,289

[22] Filed: Jan. 22, 1976

[51] Int. Cl.[2] .............................................. G02B 27/00
[52] U.S. Cl. ..................................... 350/263; 350/264
[58] Field of Search ................ 350/263, 264; 160/130, 160/131, 166 R, 196, 236

[56] References Cited

U.S. PATENT DOCUMENTS

| | | | |
|---|---|---|---|
| 483,606 | 10/1892 | Flaglor | 350/263 X |
| 1,419,918 | 6/1922 | Champeau | 350/263 |
| 2,006,648 | 7/1935 | Nobbs | 350/264 |

*Primary Examiner*—Richard A. Wintercorn
*Attorney, Agent, or Firm*—William R. Liberman

[57] ABSTRACT

A structure for illuminating vertical displays such as pictures or the like includes a rectangular window in the ceiling whose front and rear edges are spaced from the display area so that lines extending between such front and rear edges, and the top and bottom edges of the display area, are approximately between 15° and 45° to the vertical. A series of spaced inclined slats registering with the window have specular front faces and light absorbing rear faces and are inclined, related and dimensioned to direct and confine the ambient exterior light traversing the window to the display area. In one form the slats lie in forwardly downwardly converging planes and have top edges terminating in rearwardly directed flanges lying in a horizontal or inclined plane and a light modulating grid plate may be provided having alternate laterally extending opaque and transparent stripes overly the flanges and the plate is transversely adjustable.

5 Claims, 8 Drawing Figures

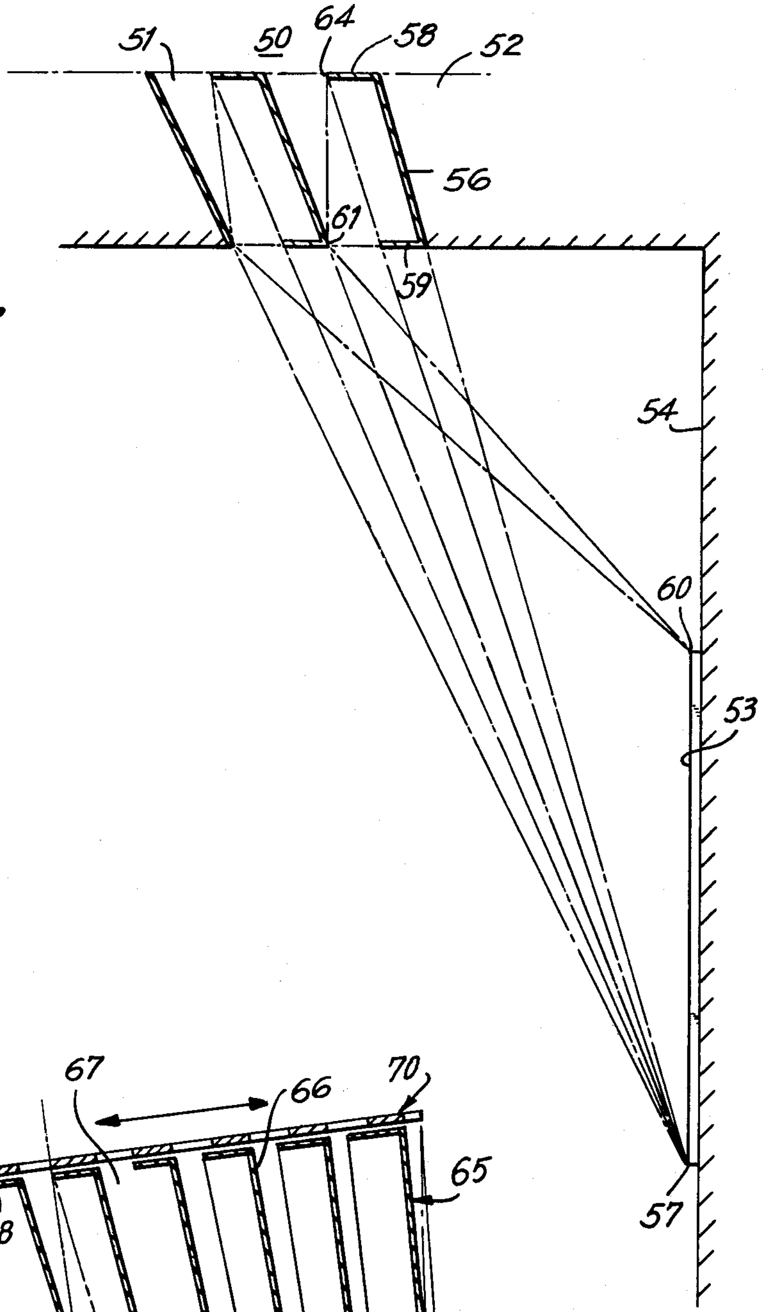
F/G. 7
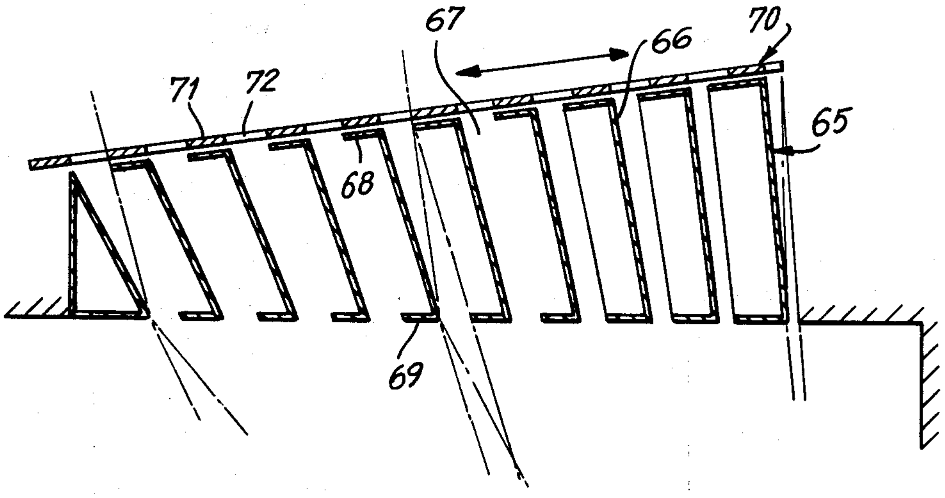
F/G. 8

DISPLAY ILLUMINATING STRUCTURE

BACKGROUND OF THE INVENTION

The present invention relates generally to improvements in display area illuminating structures and it relates more particularly to an improved system for illuminating by exterior natural or artificial ambient light substantially vertical display areas such as painting, prints and the like.

In art museums, galleries and other exhibition areas the exhibits in the form of paintings and the like are conventionally hung on vertical walls or panels and illuminated by artificial illumination or by natural ambient exterior light traversing light transmitting ceiling or windows of the light exhibition area. Where natural exterior ambient light is employed by conventional systems, the illumination of the display area and the surrounding areas affords an inferior viewing of the display area. Thus, showing in FIG. 1 of the drawing is a painting exhibition wall 10 which is typical of the prior art and includes a floor 11, a skylight ceiling 12 allowing the entry of light through the full area of the ceiling, and a vertical end wall 13 supporting a display area defining painting 14 which lies in an approximate vertical plane and is about at eye level. It is clear from the illustration that both near and far observers A and B view the painting under very poor viewing conditions. The near observer A views the painting 14 under high glare conditions due to the specular reflection by the painting 14 of the skylight to the observer, whereas the far observer B viewing the painting is exposed to direct light from the skylight. Therefore, both in the cases of near and far observers, the viewing of the painting is accompanied by high direct or reflected glare which radically reduces the contrast of the observed picture, washing out and masking fine detail. Further glare is encountered by light traversing the skylight and reflecting from other surfaces such as floor 11 and wall 13. Accordingly, the illumination of display areas by ambient exterior light by the conventional systems possesses numerous drawbacks and disadvantages.

SUMMARY OF THE INVENTION

It is a principal object of the present invention to provide an improved display area illuminating system.

Another object of the present invention is to provide an improved structure for generally illuminating by exterior ambient natural light a painting, print or other interior display area lying in a substantially vertical plane.

Still another object of the present invention is to provide an improved structure for illuminating a vertical display area by exterior ambient natural or artificial light in which direct or reflected glare to an observer is minimized or eliminated.

A further object of the present invention is to provide an improved structure for uniformly illuminating a vertical display area by exterior ambient natural light in which the intensity of light incident on the display area may be widely adjusted.

Still a further object of the present invention is to provide a structure of the above nature characterized by its reliability, efficiency, simplicity, low cost, and great versatility and adaptability.

The above and other objects of the present invention will become apparent from a reading of the following description taken in conjunction with the accompanying drawings which illustrate preferred embodiments thereof.

In a sense the present invention contemplates the provision of a system for illuminating by natural exterior ambient light a picture or other display area lying in a substantially vertical plane in an enclosed area in which a light transmitting window of predetermined shape, position and dimension in relation to the display area is located in the ceiling and means register with the window to direct and confine the light traversing the window to be incident on the display area and not be reflected specularly by the display area to an observer, the light traversing the window not reaching directly the eye of the observer. The lines from any part of the window to any part of the display are advantageously at angles of between approximately 15° and 45° to the vertical and the light directing means preferably comprise laterally extending transversely spaced slats which lie in planes which are inclined from the window to the display area and have front faces of high reflectivity, preferably specular, and light absorbing rear faces of low reflectivity, preferably a matte finish black or grey. The upper edges of the slats may be in a horizontal or inclined plane and in a preferred form terminate at their tops in rearwardly directed coplanar flanges and a light attenuating plate having alternate light transmitting and opaque stripes is superimposed on the flanges and is transversely movable to function as a diaphragm with the flanges to adjustably attenuate the light traversing the window to the display area.

The improved structure employs exterior natural ambient to illuminate a vertical display area at optimum viewing conditions with a minimum of glare, direct or reflected, to observers both proximate and remote from the display area. The structure is highly reliable, efficient, versatile and adaptable and in some of its forms is easily adjustable to modulate the intensity of the light incident on the display area.

BRIEF DESCRIPTION OF THE DRAWINGS

FIG. 7 is a view similar to FIG. 4 of still another embodiment of the present invention; and FIG. 8 is a view similar to FIG. 5 of a further embodiment of the present invention.

DESCRIPTION OF THE PREFERRED EMBODIMENTS

Figure 3:
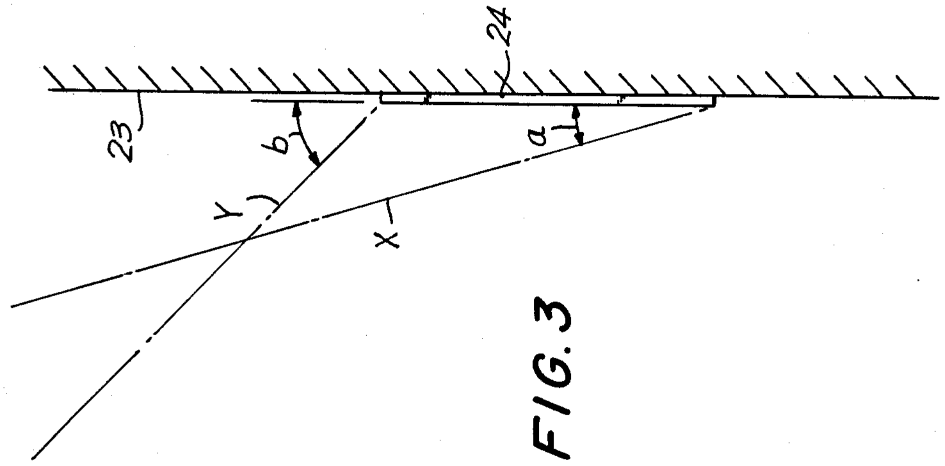
FIG. 3 is an enlarged fragmentary view of FIG. 2 illustrating the paths of light incident on the display area.
Figure 1:
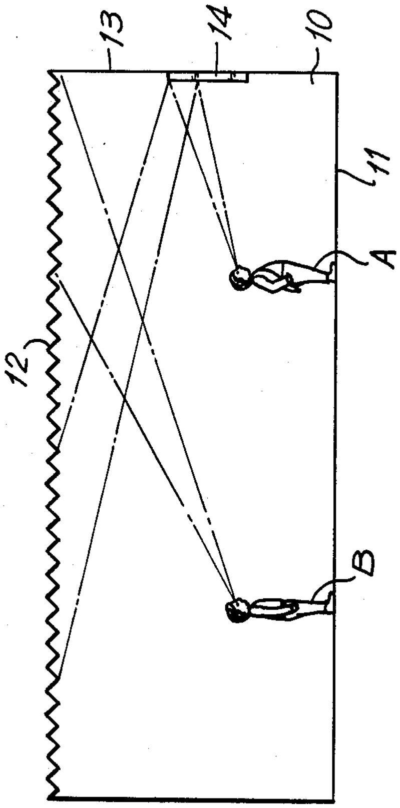
FIG. 1 PRIOR ART
FIG. 1 is a side elevational view of a picture natural ambient light illuminating structure of the prior art.
Figure 2:
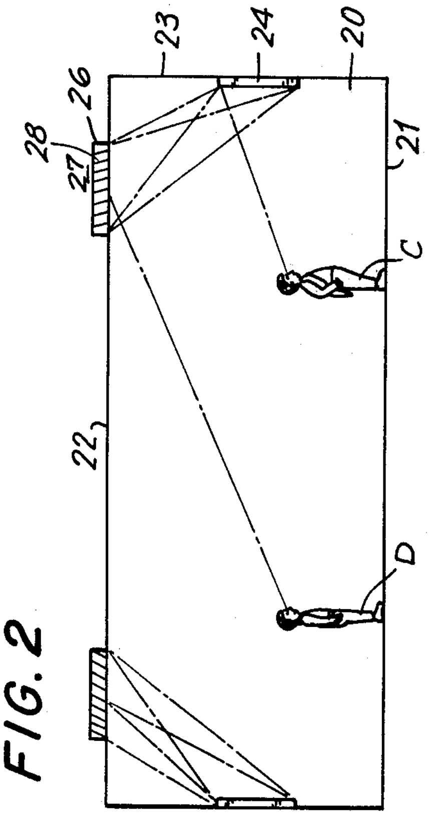
FIG. 2 is a view similar to FIG. 1 of an illuminating structure embodying the present invention.
Figure 4:
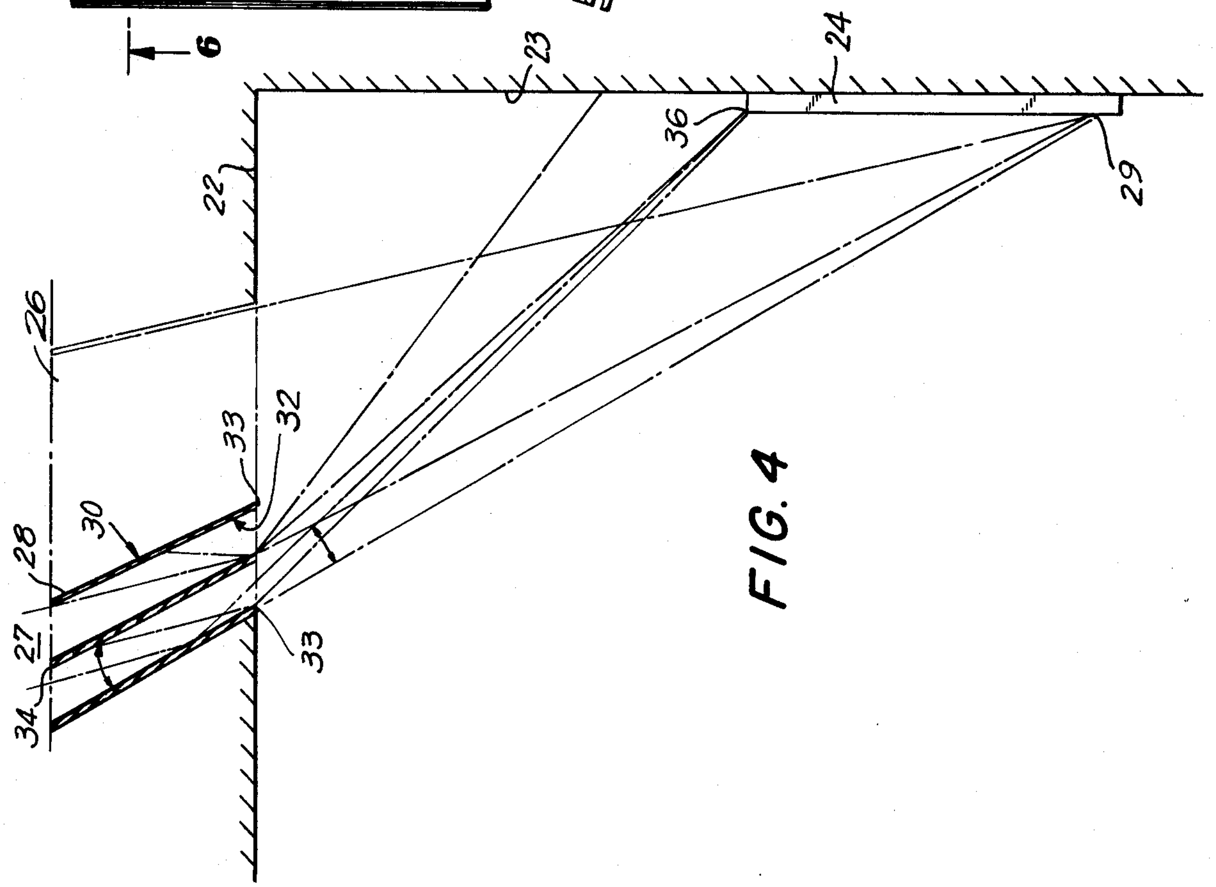
FIG. 4 is an enlarged fragmentary view of FIG. 2 showing rays of light traversing the ceiling window and light confining and directing means and incident on the display area.

Referring now to the drawings, particularly FIGS. 2 to 4 thereof which illustrate a preferred embodiment of the present invention, the reference numeral 20 generally designates a room or hall in a museum or gallery which includes a floor 21, an opaque ceiling 22 and vertical walls 23 which support one or more paintings, prints or other vertical display areas 24. The display areas 24 are mounted at levels for optimum viewing by both near and far observers C and D and depends on the size, shape and nature of the display area, which is usually rectangular and medially located at eye level.

Located or formed in the ceiling 22 in association with each display area 24 is a light transmitting, preferably rectangular window 26 which is rearwardly of the respective vertical wall 23 and is exposed to the exterior ambient or natural light. Housed in or proximate the window 26 is a light directing system 27 which confines and directs the light traversing the window 26 to the face of the display area 24 at angles of incidence such that the light through the window 26 is not directly reflected by the face of the display area 24 as glare. The angles *a* and *b* to the vertical of the planes *x* and *y* between the front and rear edges of window 26 and the bottom and top edges of display area 24 is advantageously between 15° and 45°.

The light directing and confining system 27 includes a series of transversely spaced laterally extending louvers or slats 28 which are forwardly downwardly inclined and lie in planes extending from the window 26 to the bottom edge 29 of display area 24. The front upper face 30 of each slat 28 is specular, advantageously fully specular, or it may be partly etched and the rear bottom face 32 of each slat 28 is highly light absorbing and of low relectivity and it is advantageously of a black matte finish although it may be of other colors. The depth of and the transverse spacing between the slats 28 are so related that the light directly traversing the passageway between successive slats 28 reaches the exhibit 24 with a minimum of attenuation and together with all the light once reflected by the respective specular face 30 is incident on the display area 24 at angles therewith between 15° and 45°.

As best seen in FIG. 4, the first or rearmost of the slats 28 has an angle of inclination corresponding to that of a plane passing between its bottom edge 33 and the bottom edge 29 of display area 24. The depth of the first slat 28 is a matter of choice; the deeper the slat, the deeper and less numerous are the remaining slats. The slat dimensions are determined so that a ray of light from 36 to 33 is reflected on the specular face of the first slat 28 and barely clears the top of the second slat 28. The plane of the second slat extends between its upper edge and display area bottom edge 29. The spacing and angles of the remaining slats are similarly determined. Thus, the light traversing window 26 and system 27 is confined to the display area 24 and is incident thereon at a nonglare angle of between 15° and 45° to the vertical.

The slats 28 all converge to display area bottom edge 29 from which unobstructed view through the passageways between successive slats 28 is obtained. Moreover, the upper edge 36 has an unobstructed view of the top entrances to the light passageways through single reflections from the slat specular faces 30. The area above top edge 36 does not have direct or single specular surface reflection access to the light incident on the system 27 but is exposed to only highly attenuated light effected by reflection from the black matte faces 32 while below bottom edge 29 exposure to specular reflected light is eliminated and to direct light is progressively reduced.

It should be noted that the slat lower and upper edges 33 and 34 need not be horizontal planes but may be in inclined planes. Moveover, in order to strengthen the slats they may terminate at either upper or lower edges in flanges which are preferably rearwardly directed. In each case, however, the depths and spacings of the slats are adjusted to achieve the display area illumination parameters explained above.

Figure 5:
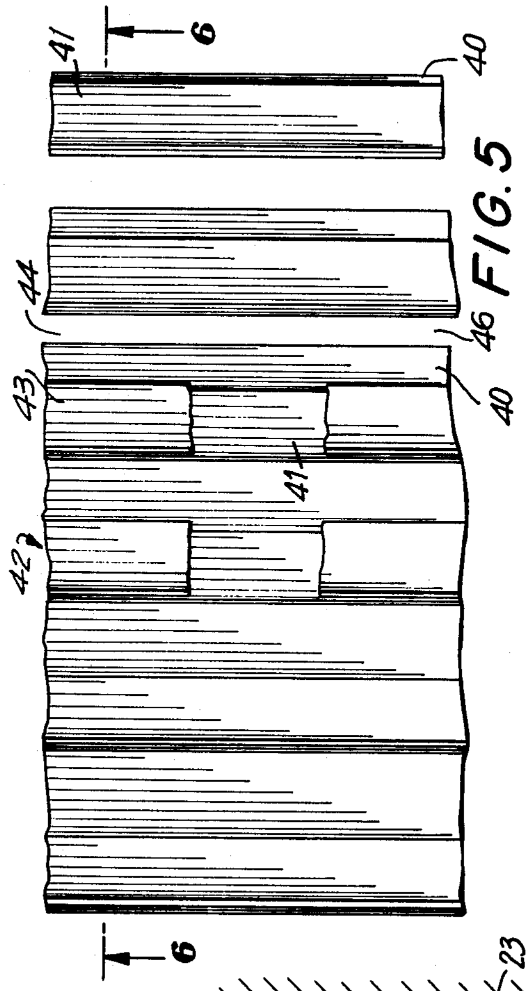
FIG. 5 is a fragmentary top plan view of another embodiment of the present invention.
Figure 6:
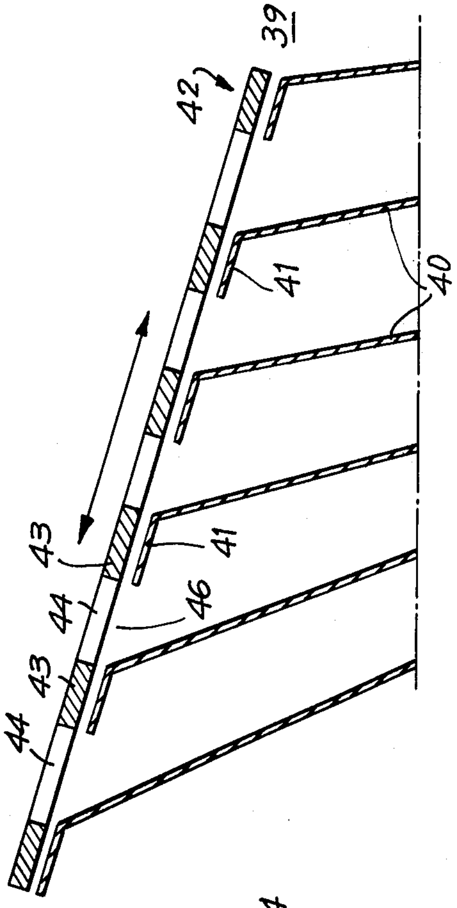
FIG. 6 is a sectional view taken along line 6—6 in FIG. 5.

In FIGS. 5 and 6 of the drawings there is illustrated another embodiment of the present invention which differs from that first described primarily in that it permits adjustment of the amount of light traversing the light directing and confining system. The modified system is designated as 39 and is employed in a ceiling window corresponding to window 26 and associated with a respective display area 24. The system 39 includes a group of transversely spaced laterally extending slats converging downwardly and forwardly to the display area and, as in the case of slats 28, having specular front faces and high light absorbing, preferably black matte, rear faces.

The slats 40 terminate at their top edges in rearwardly directed upwardly rearwardly inclined coplanar flanges 41 and may likewise terminate at their bottoms in rearwardly directed flanges. The dimensions and spacings and angles of the slats 40 and flanges 41 are so determined and related to the display area as to achieve the parameters described in which the light traversing the system is primarily confined to the display area obstructed only by the flanges 41.

Directly overlying and parallel to the plane of the upper flanges 41 is a transversely slidably movable light attenuating plate 42 which includes transversely spaced laterally extending parallel alternate opaque stripes or bands 43 and transparent or translucent stripes 44. In the retracted or fully open position of the attenuating plate 42, as shown in FIG. 6, the opaque stripes 43 coincide with flanges 41 and the transmissive stripes 44 coincide with the light entry slots 46 between successive flanges 41. The slots 46 and flanges 41 are of equal widths as are stripes 43 and 44. In reducing the amount of light traversing the system 39 and incident on the display area to compensate for variations in the exterior ambient light intensity, the attenuating plate 42 is shifted to the left, as viewed in FIG. 6, to reduce the widths of the light entrance slots 46 by masking portions thereof.

Referring now to FIG. 7 of the drawing there is illustrated another embodiment of the present invention which differs from that first described in that the light directing slats are provided and strengthened with horizontal coplanar rearwardly directed flanges along their top and bottom flanges and are modified in their dimensions and spacing to compensate for such flanges. Specifically, the light directing and confining system 50 nests in a rectangular window 51 in a ceiling 52 and functions to illuminate a display area 53 on a vertical wall spaced forwardly of window 51.

The system 50 includes transversely spaced laterally extending slats 56 which are forwardly downwardly inclined and lie in planes converging to the bottom horizontal edge 57 of the display area 53. The upper and lower edges of slats 56 lie in corresponding horizontal upper and lower planes and the front face of the slats 56 are specular and the rear faces thereof are highly light absorbing and of low reflectivity.

The top edges of the slats 56 except for the rearmost slat terminate in rearwardly directed horizontal coplanar flanges 58 and the edges of the slats 56 except for the rearmost slots terminate in rearwardly directed horizontal coplanar flanges 59. The free outer edges of each pair of upper and lower flanges 58 and 59 lie in a respective plane extending from the display area lower edge 57 and the slats 56 and upper flanges 58 are so dimensioned and related that the dihedral angles between the plane containing the rear edge 64 of each of the upper flanges and the bottom edge 61 of the next rearwardly successive slat 56 and the plane of such slat is equal to the dihedral angle between the plane of this slat and the plane containing the bottom edge of such slat and the top edge 60 of the display area 53.

Another form of light directing and confining system is shown in FIG. 8 and includes features of the embodiments shows in FIGS. 5 to 7. The modified system 65 includes a group of transversely spaced laterally extending slats which nests in the ceiling skylight window 67. The slats 66 lie in planes which converge to the bottom edge of the display area and are provided along their top and bottom edges with rearwardly directed top and bottom flanges 68 and 69 respectively, the top flanges 68 lying in a common rearwardly downwardly inclined plane and the bottom flanges lying in a common horizontal plane. The dimensions and spacings of the slats 66 and flanges 68 and 69 relative to the display area are determined in the manner of the flanges and slats in the last described embodiment.

I claim:

1. A display illuminating structure comprising a ceiling, a floor, a vertically extending display area disposed between said ceiling and floor and delineated by top and bottom edges, said ceiling having a light transmissive window therein with front and rear edges proximate and remote from the plane of said display area and being exposed to the exterior ambient light, the planes between the top and bottom edges of said display area and the front rear edges of said window being at angles between about 15° and 45° to the plane of said display area, and means registering with said window directing and confining the major portion of the light incident on said window to said display area, wherein the light directing means comprises a plurality of transversely spaced, laterally extending slats inclined at angles between 15° and 45° to the vertical, and said angles of inclination increase with the distance of the respective slats from the plane of the display area, and the rearwardly directed faces of said slats are of low light reflectivity.

2. The display illuminating structure of claim 1 wherein said slats are dimensioned, shaped and inclined so that exterior ambient light incident on and reflected by said specular faces is confined by the successively forward slats to the display area.

3. The display illuminating structure of claim 1 wherein the upper edges of said slats lie in a forwardly downwardly inclined plane and terminate at their tops in rearwardly directed flanges lying in said plane.

4. The display illuminating structure of claim 3 including a forwardly rearwardly movable inclined light modulating plate including transversely spaced laterally extending parallel alternate light transmissive and light absorbing areas movable into adjustable registry with said flanges.

5. The display illuminating device of claim 1, wherein the forwardly directed faces of said slats are specular.

* * * * *